US010412587B1

(12) United States Patent
Miller et al.

(10) Patent No.: US 10,412,587 B1
(45) Date of Patent: Sep. 10, 2019

(54) DEVICE, SYSTEM AND METHOD TO SECURE DEPLOYABLE ACCESS POINTS IN A SIDE-HAUL COMMUNICATION NETWORK FROM A COMPROMISED DEPLOYABLE ACCESS POINT

(71) Applicant: MOTOROLA SOLUTIONS, INC., Chicago, IL (US)

(72) Inventors: Trent J. Miller, West Chicago, IL (US); Lee M. Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/002,623

(22) Filed: Jun. 7, 2018

(51) Int. Cl.

| | |
|---|---|
| *H04W 12/08* | (2009.01) |
| *H04W 88/08* | (2009.01) |
| *H04W 92/20* | (2009.01) |
| *H04W 76/30* | (2018.01) |
| *H04W 12/04* | (2009.01) |
| *H04L 9/08* | (2006.01) |
| *H04K 3/00* | (2006.01) |
| *H04W 84/10* | (2009.01) |
| *H04W 92/10* | (2009.01) |

(52) U.S. Cl.
CPC .............. *H04W 12/08* (2013.01); *H04K 3/00* (2013.01); *H04L 9/0819* (2013.01); *H04W 12/04* (2013.01); *H04W 76/30* (2018.02); *H04W 84/105* (2013.01); *H04W 88/08* (2013.01); *H04W 92/10* (2013.01); *H04W 92/20* (2013.01)

(58) Field of Classification Search
CPC ..... H04W 12/04; H04W 12/08; H04W 76/30; H04W 84/105; H04W 88/08; H04W 92/10; H04W 92/20; H04L 9/0819; H04K 3/00
See application file for complete search history.

(56) References Cited

U.S. PATENT DOCUMENTS

| 9,276,871 | B1 * | 3/2016 | Freitas | ................ | H04L 61/2007 |
| 10,206,115 | B2 * | 2/2019 | Wu | ................ | H04W 16/14 |
| 10,242,547 | B1 * | 3/2019 | Struhsaker | ............ | H04L 67/025 |
| 2006/0165107 | A1 * | 7/2006 | Legallais | ................ | H04L 12/18 |
| | | | | | 370/401 |
| 2009/0016211 | A1 * | 1/2009 | Gresset | ................ | G06F 17/142 |
| | | | | | 370/210 |
| 2009/0047931 | A1 * | 2/2009 | Nanda | ................... | H04W 48/02 |
| | | | | | 455/411 |
| 2009/0172391 | A1 * | 7/2009 | Kasapidis | ............. | H04L 63/061 |
| | | | | | 713/156 |

(Continued)

Primary Examiner — Dominic E Rego
(74) Attorney, Agent, or Firm — Perry + Currier, Inc.

(57) ABSTRACT

A device, system and method to secure deployable access points in a side-haul communication network from a compromised deployable access point is provided. An indication that a second deployable access point is compromised is received at a first deployable access point in a side-haul communication network. The first deployable access point requests, from one or more communication devices, one or more manual confirmation votes indicating whether the second deployable access point is compromised. When a threshold number of the one or more manual confirmation votes received indicate that the second deployable access point is compromised, the first deployable access point implements an action to secure the deployable access points in the side-haul communication network from the second deployable access point.

20 Claims, 10 Drawing Sheets

(56) References Cited

U.S. PATENT DOCUMENTS

| | | | |
|---|---|---|---|
| 2011/0145911 A1* | 6/2011 | O'Brien | H04L 45/00 |
| | | | 726/13 |
| 2013/0288668 A1 | 10/2013 | Pragada et al. | |
| 2014/0036787 A1* | 2/2014 | Ganu | H04W 16/10 |
| | | | 370/329 |
| 2014/0187257 A1* | 7/2014 | Emadzadeh | G01S 5/0242 |
| | | | 455/456.1 |
| 2014/0282877 A1 | 9/2014 | Mahaffey et al. | |
| 2014/0335791 A1 | 11/2014 | Kim et al. | |
| 2015/0358877 A1* | 12/2015 | Wei | H04W 36/14 |
| | | | 370/331 |
| 2016/0029403 A1 | 1/2016 | Roy et al. | |
| 2016/0143033 A1* | 5/2016 | Falkenstein, Jr. | H01Q 21/065 |
| | | | 370/338 |
| 2016/0219061 A1 | 7/2016 | Walton et al. | |
| 2017/0150398 A1* | 5/2017 | Laselva | H04W 36/165 |
| 2017/0265175 A1* | 9/2017 | Gandhi | H04W 76/20 |
| 2018/0241450 A1* | 8/2018 | Shukla | H04B 7/0617 |
| 2018/0242249 A1* | 8/2018 | Yang | H04W 52/028 |

* cited by examiner

US 10,412,587 B1

DEVICE, SYSTEM AND METHOD TO SECURE DEPLOYABLE ACCESS POINTS IN A SIDE-HAUL COMMUNICATION NETWORK FROM A COMPROMISED DEPLOYABLE ACCESS POINT

BACKGROUND OF THE INVENTION

In situations where a single access point may not be sufficient to cover an incident area, public safety agencies may deploy multiple deployable access points to provide coverage to their subscribers, such as portable communication devices operated by first responders, such as police officers. The access points may be generally provisioned to communicate on local side-haul links, that may form a mesh network, and the like. However, as the access points are portable, they may be susceptible to being compromised, for example, stolen.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
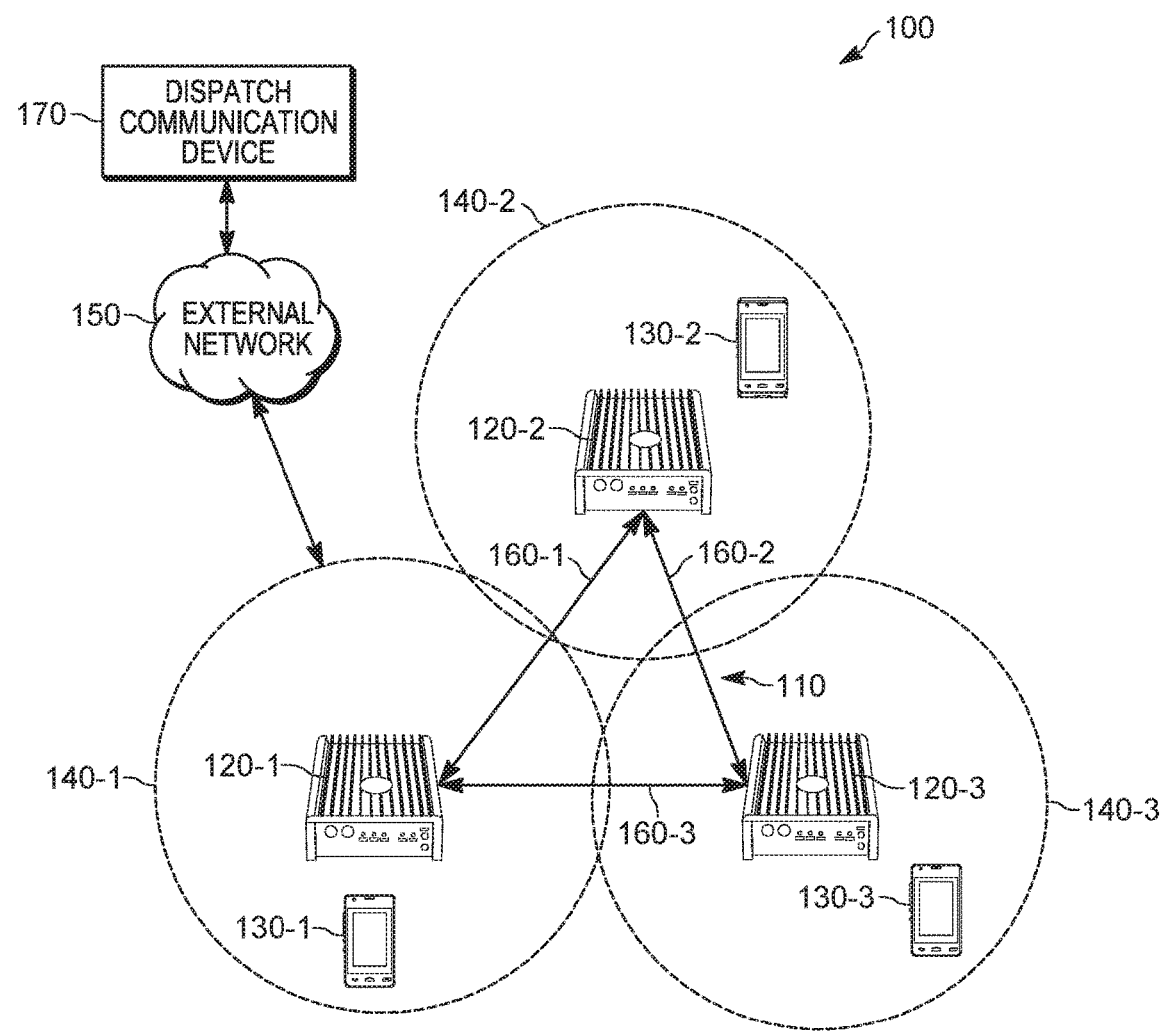
FIG. 1 is a system for securing deployable access points in a side-haul communication network from a compromised deployable access point in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a deployable access point comprising: a portable housing; a communication unit configured to communicate with deployable access points using one or more side-haul links in a side-haul communication network; and a controller configured to: receive, via the communication unit, an indication that a second deployable access point is compromised; request, via the communication unit, from one or more communication devices, one or more manual confirmation votes indicating whether the second deployable access point is compromised; receive, via the communication unit, the one or more manual confirmation votes; and when a threshold number of the one or more manual confirmation votes indicate that the second deployable access point is compromised, implement an action to secure the deployable access points in the side-haul communication network from the second deployable access point.

Another aspect of the specification provides a method comprising: receiving, at a controller of a first deployable access point, via a communication unit of the first deployable access point, an indication that a second deployable access point is compromised, the communication unit configured to communicate with deployable access points using one or more side-haul links in a side-haul communication network; requesting, using the controller, via the communication unit, from one or more communication devices, one or more manual confirmation votes indicating whether the second deployable access point is compromised; receiving, at the controller, via the communication unit, the one or more manual confirmation votes; and when a threshold number of the one or more manual confirmation votes indicate that the second deployable access point is compromised, implementing, using the controller, an action to secure the deployable access points in the side-haul communication network from the second deployable access point.

Another aspect of the specification provides a system comprising: a plurality of deployable access points communicating in a side-haul communication network; and one or more communication devices, a first deployable access point, of the plurality of deployable access points, configured to: receive an indication that a second deployable access point is compromised; transmit, to the one or more communication devices, a command which requests a manual confirmation of the second deployable access point being compromised; receive, from the one or more communication devices, one or more manual confirmation votes of the second deployable access point being compromised; and when a threshold number of one or more manual confirmation votes indicate that the second deployable access point is compromised, implement an action to secure the deployable access points in the side-haul communication network from the second deployable access point, the one or more communication devices configured to: receive the command; open an associated application which requests the manual confirmation of the second deployable access point being compromised via a local input device; receive, via the local input device, a manual confirmation vote of the second deployable access point being compromised; and transmit, to the first deployable access point, the manual confirmation vote.

FIG. 1 illustrates a system 100, including a side-haul communication network 110, which may include more or fewer components and may perform functions other than those explicitly described herein. The side-haul communication network 110 is interchangeably referred to hereafter as the network 110.

In the depicted example, the side-haul communication network 110 includes a plurality of deployable access points 120-1, 120-2, 120-3, interchangeably referred to hereafter, collectively, as the deployable access points 120 and, generically, as a deployable access point 120. The three deployable access points 120 may also be referred to as a first deployable access point 120-1, a second deployable access point 120-2, and a third deployable access point 120-3.

Each of the deployable access points 120 may comprise a portable access point including, but not limited to, a backpack-fitted access point, a vehicle-mounted access point, an aerial and/or drone-mounted access point, and/or an autonomous vehicle-mounted access point and the like. Indeed, one or more of the deployable access points 120 may comprise a drone and/or an autonomous vehicle. Furthermore, while three deployable access points 120 are depicted, the side-haul communication network 110 may include as few as two deployable access points 120 and more than three deployable access points 120.

Furthermore, deployable access points 120 may be of different types; for example, one of the deployable access points 120 may be a command deployable access point 120, while others of the deployable access points 120 may be non-command deployable access points 120.

Each of the deployable access points 120 may comprise, for example, a Node B, an Evolved Node B (eNodeB), a microsite or a similar transceiver station or telecommunications node. In one example, a deployable access point 120 may comprise a long-term evolution (LTE) eNodeB.

The deployable access points 120 provide wireless communication coverage to communication devices 130-1, 130-2, 130-3, interchangeably referred to hereafter, collectively, as the communication devices 130 and, generically, as a communication device 130. The communication devices 130-1, 130-2, 130-3 may comprise portable communication devices, alternatively referred to as subscriber devices and User Equipment (UE).

Indeed, the system 100 may include an incident area, for example to which users of the deployable access points 120 and the communication devices 130 have been deployed, for example in response to an incident.

As depicted, the first deployable access point 120-1 provides wireless communication coverage to mobile communication devices 130 that are within a first coverage range 140-1 of the first deployable access point 120-1, for example, the communication device 130-1. The second deployable access point 120-2 provides wireless communication coverage to mobile communication devices 130 that are within a second coverage range 140-2 of the second deployable access point 120-2, for example, the communication device 130-2. Similarly, the third deployable access point 120-3 provides wireless communication coverage to mobile communication devices 130 that are within a third coverage range 140-3 of the third deployable access point 120-3, for example, the communication device 130-3. The coverage ranges 140-1, 140-2, 140-3 are interchangeably referred to hereafter, collectively, as the coverage ranges 140 and, generically, as a coverage range 140.

While in FIG. 1 only mobile communication device 130 is depicted within each coverage range 140, any number of mobile communication devices 130 may be within each coverage range 140. Hence, while only three communication devices 130 are depicted in FIG. 1, the system 100 may comprise as few as one communication device 130 and more than three communication devices 130. Furthermore, the coverage regions 140 may overlap, or not overlap.

The deployable access points 120 may be connected to at least one external network 150 (referred to hereafter as the external network 150) through back-haul management devices (not shown in FIG. 1). Networks that are suitable for use as the external network 150 include, but are not limited to, other deployable networks, private networks and carrier networks. Suitable networks include a global system for mobile communication (GSM) network, a high speed packet access (HSPA) network, a code-division multiple access (CDMA) network, a long-term evolution (LTE) network, a long-term evolution advanced (LTE-A) network, a microwave network, a millimeter wave network, a Project "25" network, a terrestrial trunked radio (TETRA) network, a land mobile radio (LMR) network, a satellite network, and the like.

In one example, the back-haul management devices include a core network function (for example, an evolved packet core (EPC) function) and a back-haul management entity. In some embodiments, rather than being connected to the external network 150 through back-haul management devices, one or more of the deployable access points 120 may be connected to the external network 150 through another deployable access point 120, for example, in a mesh network.

In one example, as depicted, the deployable access points 120 are connected to the external network 150 through the first deployable access point 120-1 and the back-haul management devices (not depicted) associated with the first access point 120-1.

In addition to being connected to the external network 150, the deployable access points 120 also communicate with each other over a back-haul network (e.g. the external network 150) or the side-haul communication network 110.

In a back-haul network, the deployable access points 120 communicate with each other through the back-haul management devices and the external network 150. In the side-haul communication network 110, the deployable access points 120 may communicate over out-of-band radio frequency (RF) connections (e.g. using an RF spectrum different from the back-haul network) to form, for example, a side-haul mesh network of the system 100. The out-of-band RF connections reduce interference with the network coverage provided by the deployable access points 120. In other embodiments, the deployable access points 120 communicate over in-band RF connections, which may share frequency or time resources with the wireless communication coverage provided by the deployable access points 120 of the system 100. In some embodiments, the deployable access points 120 communicate with each other over a combination of back-haul and side-haul networks, including, but not limited to, the side-haul communication network 110. The communicative connection between the deployable access points 120 may be referred to as a side-haul connection and/or a side-haul link, regardless of whether the deployable access points 120 are connected over the back-haul network or over the side-haul communication network 110.

The side-haul communication network 110 may be a meshing, point-to-multipoint, or point-to-point link, including a satellite link, a wide area network link, a local area network link, a microwave link, a millimeter wave link, or the like. The side-haul connection may also include a narrowband data link, such as a Project 25 (P25), a Digital Mobile Radio (DMR) data link, a terrestrial trunked radio (TETRA) link, or the like. Additionally, the side-haul connection may further include a LTE link, Wi-Fi™ link, Bluetooth® link, 802.11ah, 802.15.4(g) link, or the like.

For example, as depicted, the deployable access points 120 may form a mesh network, and may communicate via side-haul links 160-1, 160-2, 160-3, interchangeably referred to hereafter, collectively, as the links 160 and, generically, as a link 160. For example, each deployable access point 120 may include a core back-haul network, for example within a coverage range 140, that interoperates with other core back-haul networks across the other deployable access points 120 of the system 100, via the side-haul communication network 110 formed from the links 160.

The mobile communication devices 130 may be, for example, two-way radios, smart telephones, tablet computers, laptop computers, vehicle-mounted radios, drone-mounted radios, modems, relays, and the like. In one example, the mobile communication devices 130 may be LTE User Equipment (UE) devices. The mobile communication devices 130 communicate with each other via messages sent and received to and from the deployable access points 120. In certain instances, the mobile communication devices 130 also receive application services. The application services may be provided from application servers located in the external network 150 via communications that occur through the deployable access points 120. In some embodiments, some or all the application services reside on a local server along with other network devices that are directly connected to a deployable access point 120. For example, a push-to-talk (voice over internet protocol (VOIP)) or video server may reside alongside a core network connected to a deployable access point 120.

Furthermore, the mobile communication devices 130 may communicate with a dispatch communication device 170, for example via the external network 150, and located at a dispatch center and the like, the dispatch communication device 170 operated by a dispatcher, and the like.

Figure 2:
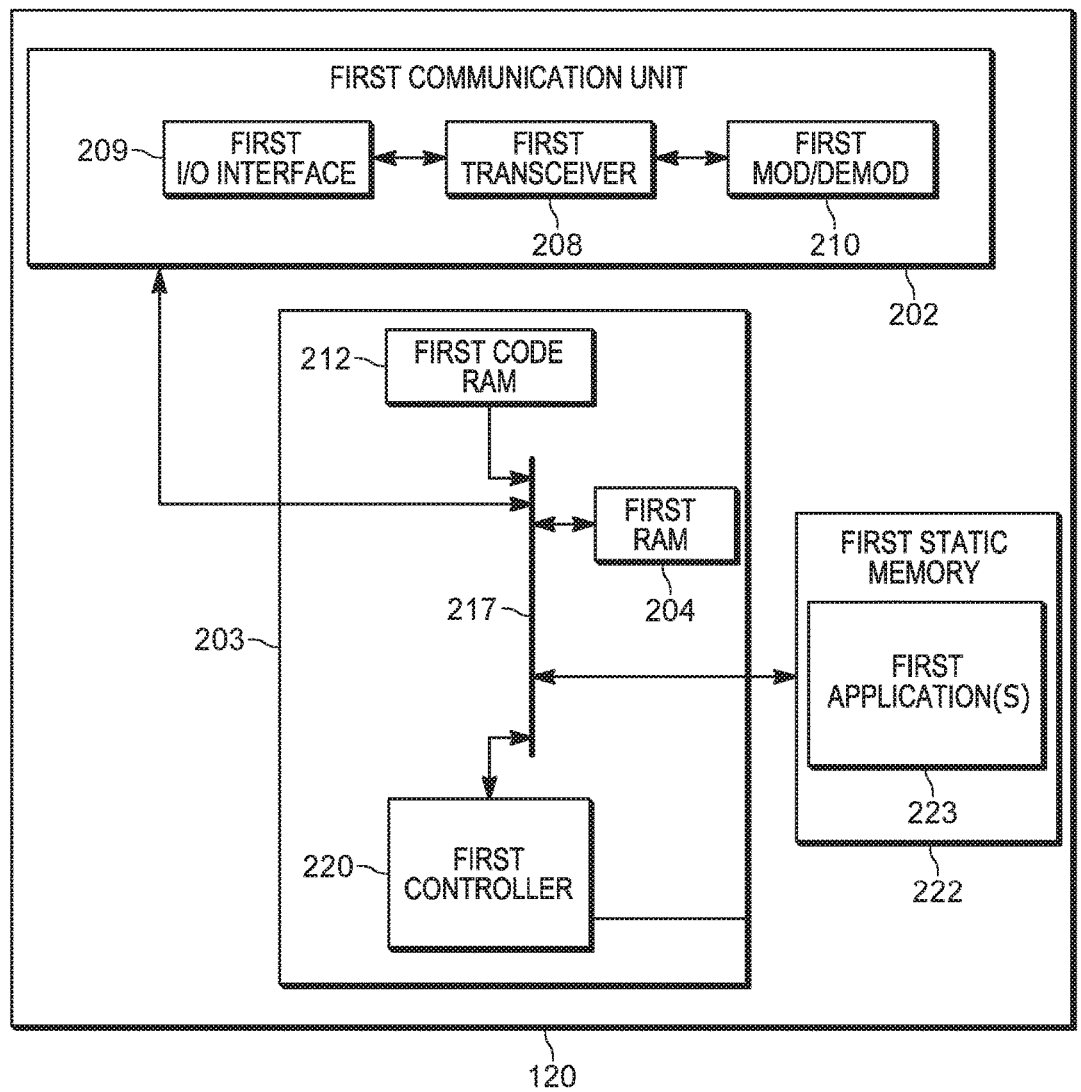
FIG. 2 is a device diagram showing a device structure of a deployable access point in accordance with some embodiments.

Attention is next directed to FIG. 2 which depicts which sets forth a schematic diagram of an example deployable access point 120. Furthermore, the functionality of the deployable access point 120 may be distributed among a plurality of deployable access point 120, and the like.

As depicted in FIG. 2, the example deployable access point 120 generally includes a first communications unit 202, a first processing unit 203, a first Random-Access Memory (RAM) 204, one or more first wireless transceivers 208, one or more first wired and/or wireless input/output (I/O) interfaces 209, a first combined modulator/demodulator 210, a first code Read Only Memory (ROM) 212, a first common data and first address bus 217, a first controller 220, and a first static memory 222 storing at least one first application 223 for securing deployable access points in a side-haul communication network from a compromised deployable access point. Hereafter, the at least one application 223 will be interchangeably referred to as the application 223.

The deployable access point 120 is described hereafter in further detail.

As shown in FIG. 2, the deployable access point 120 includes the communications unit 202 coupled to the common data and address bus 217 of the processing unit 203. While not depicted, the deployable access point 120 may also include one or more input devices (e.g., keypad, pointing device, touch-sensitive surface, etc.) and a display screen (which, in some embodiments, may be a touch screen and thus also act as an input device), each coupled to be in communication with the processing unit 203. The deployable access point 120 may also include one or more of speaker and a microphone used for interactions with the deployable access point 120.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices.

For example, the communications unit 202 may include one or more wireless transceivers 208, such as a DMR transceiver, a P25 transceiver, a TETRA transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network. Regardless, the communications unit 202 is configured to provide coverage in a back-haul network for communication devices 130 in a coverage range 140, and to communicate with other deployable access points 120 via links 160.

The communications unit 202 may optionally include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. However, as described herein, the example deployable access points 120 are configured to operate wirelessly. The transceiver 208 is also coupled to a combined modulator/demodulator 210.

The controller 220 may include ports (e.g. hardware ports) for coupling to other hardware components (e.g. a display screen, an input device, a speaker and/or a microphone, and the like).

The controller 220 includes one or more logic circuits, one or more processors, one or more microprocessors, one or more ASIC (application-specific integrated circuits) and one or more FPGA (field-programmable gate arrays), and/or another electronic device. In some embodiments, the controller 220 and/or the deployable access point 120 is not a generic controller and/or a generic device, but a device specifically configured to implement functionality for securing deployable access points in a side-haul communication network from a compromised deployable access point. For example, in some embodiments, the deployable access point 120 and/or the controller 220 specifically comprises a computer executable engine configured to implement functionality for securing deployable access points in a side-haul communication network from a compromised deployable access point.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the deployable access point 120 as described herein are maintained, persistently, at the memory 222 and used by the controller 220 which makes appropriate utilization of volatile storage during the execution of such programming instructions.

In particular, the memory 222 stores instructions corresponding to the at least one application 223 that, when executed by the controller 220, enables the controller 220 to implement functionality for securing deployable access points in a side-haul communication network from a compromised deployable access point. In illustrated examples, when the controller 220 executes the one or more applications 223, the controller 220 is enabled to: receive, via the communication unit 202, an indication that a second deployable access point is compromised; request, via the communication unit 202, from one or more communication devices, one or more manual confirmation votes indicating whether the second deployable access point is compromised; receive, via the communication unit 202, the one or more manual confirmation votes; and when a threshold number of the one or more manual confirmation votes indicate that the second deployable access point is compromised, implement an action to secure the deployable access points in the side-haul communication network from the second deployable access point.

Figure 3:
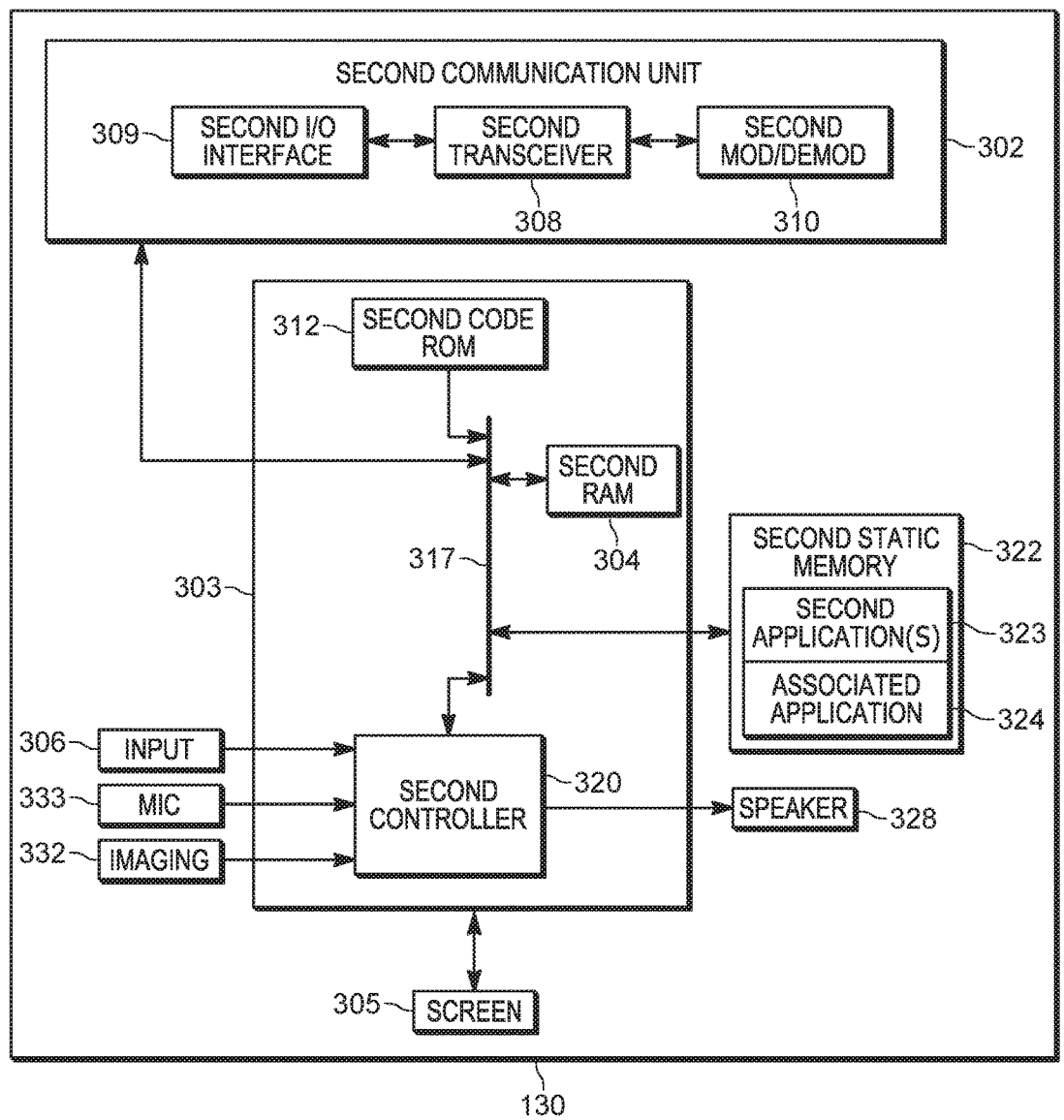
FIG. 3 is a device diagram showing a device structure of a communication device in accordance with some embodiments.

Attention is next directed to FIG. 3 which sets forth a schematic diagram that illustrates an example communication device 130. The dispatch communication device 170 may have a similar structure as the example communication device 130 of FIG. 3, adapted, however, to the functionality and/or the environment of a dispatch communication device.

As depicted in FIG. 3, the example communication device 130 generally includes a second communications unit 302, a second processing unit 303, a second Random-Access Memory (RAM) 304, a display screen 305, an input device 306, one or more second wireless transceivers 308, one or more second wired and/or wireless input/output (I/O) interfaces 309, a second combined modulator/demodulator 310, a second code Read Only Memory (ROM) 312, a second common data and address bus 317, a second controller 320, a second static memory 322 storing at least one second application 323 (interchangeably referred to hereafter as the application 323) and an associated application 324, a speaker 328, an imaging device 332 and a microphone 333.

However, while the example communication device 130 is described with respect to including certain components, it is understood that the example communication device 130 may be configured according to the functionality of a specific device. For example, one or more of the imaging device 332, the microphone 333 and/or other media components associated with the example communication device 130 may be external to the example communication device 130 and communicatively coupled thereto.

As another example, in some embodiments, the example communication device 130 may further include a location determination device (for example, a global positioning system (GPS) receiver) and the like. Other combinations are possible as well.

The example communication device 130 is described hereafter in further detail. As shown in FIG. 3, the example communication device 130 includes the communications unit 302 coupled to the common data and address bus 317 of the processing unit 303. The example communication device 130 may also include one or more input devices 306 (e.g., keypad, pointing device, touch-sensitive surface, etc.) and the display screen 305 (which, in some embodiments, may be a touch screen and thus also act as an input device 306), each coupled to be in communication with the processing unit 303.

The speaker 328 may be present for reproducing audio that is decoded from voice or audio streams of calls received via the communications unit 302 from other portable communication devices. The microphone 333 may be present for capturing audio from a user (not depicted) that is further processed by the processing unit 303 and/or is transmitted as voice or audio data by the communications unit 302 to other communication devices. Hence, the combination of the speaker 328 and the microphone 333 may enable the communication devices 130 to be used to communicate via voice communications, channels and/or talkgroups, and the like.

The imaging device 332 may provide video (still or moving images) of an area in a field of view of the example communication device 130 for further processing by the processing unit 303 and/or for further transmission by the communications unit 302 and which may also be used in communications via channels and/or talkgroups.

The processing unit 303 may include the code Read Only Memory (ROM) 312 coupled to the common data and address bus 317 for storing data for initializing system components. The processing unit 303 may further include the controller 320 coupled, by the common data and address bus 317, to the Random-Access Memory (RAM) 304 and a static memory 322.

The communications unit 302 may include one or more wired and/or wireless input/output (I/O) interfaces 309 that are configurable to communicate with the other communication devices 130, 170.

For example, the communications unit 302 may include one or more wireless transceivers 308, such as a digital mobile radio (DMR) transceiver, a Project 25 (P25) transceiver, a TETRA transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 302 may additionally or alternatively include one or more wireline transceivers 308, such as an Ethernet transceiver, a USB transceiver, or similar transceiver configurable to communicate via a twisted pair wire, a coaxial cable, a fiber-optic link, or a similar physical connection to a wireline network. The transceiver 308 is also coupled to a combined modulator/demodulator 310. However, as described herein, the communication devices 130, 170 are configured to communicate wirelessly.

The controller 320 may include ports (e.g. hardware ports) for coupling to the display screen 305, the input device 306, the imaging device 332, the speaker 328 and/or the microphone 333.

The controller 320 includes one or more logic circuits, one or more processors, one or more microprocessors, one or more ASIC (application-specific integrated circuits) and one or more FPGA (field-programmable gate arrays), and/or another electronic device. In some embodiments, the controller 320 and/or the example communication device 130 is not a generic controller and/or a generic device, but a device specifically configured to implement functionality for receiving manual confirmations of a deployable access point being compromised and/or for initiating an indication of a deployable access point being compromised. For example, in some embodiments, the example communication device 130 and/or the controller 320 specifically comprises a computer executable engine configured to implement functionality for receiving manual confirmations of a deployable access point being compromised and/or for initiating an indication of a deployable access point being compromised.

The static memory 322 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 3, programming instructions (e.g., machine readable instructions) that implement the functional teachings of the example communication device 130 as described herein are maintained, persistently, at the memory 322 and used by the controller 320 which makes appropriate utilization of volatile storage during the execution of such programming instructions.

In particular, the memory 322 stores instructions corresponding to the application 323 that, when executed by the controller 320, enables the controller 320 to implement functionality for receiving manual confirmations of a deployable access point being compromised. In illustrated examples, when the controller 320 executes the application 323, the controller 320 is enabled to: receive a command, from a first deployable access point, which requests a manual confirmation of a second deployable access being compromised; open the associated application 324 which requests the manual confirmation of the second deployable access point being compromised via a local input device (e.g. the input device 306); receive, via the local input device, a manual confirmation vote of the second deployable access point being compromised; and transmit, to the first deployable access point, the manual confirmation vote.

In some embodiments, the application 323, when executed by the controller 320, enables the controller 320 to implement functionality for initiating an indication of a deployable access point being compromised. In illustrated examples, when the controller 320 executes the application 323, for example in mode different from a mode for receiving manual confirmations of a deployable access point being compromised, the controller 320 is enabled to: receive an identifier of a deployable access point; and transmit the identifier of the deployable access point as an indication that the deployable access point is compromised.

Figure 4:
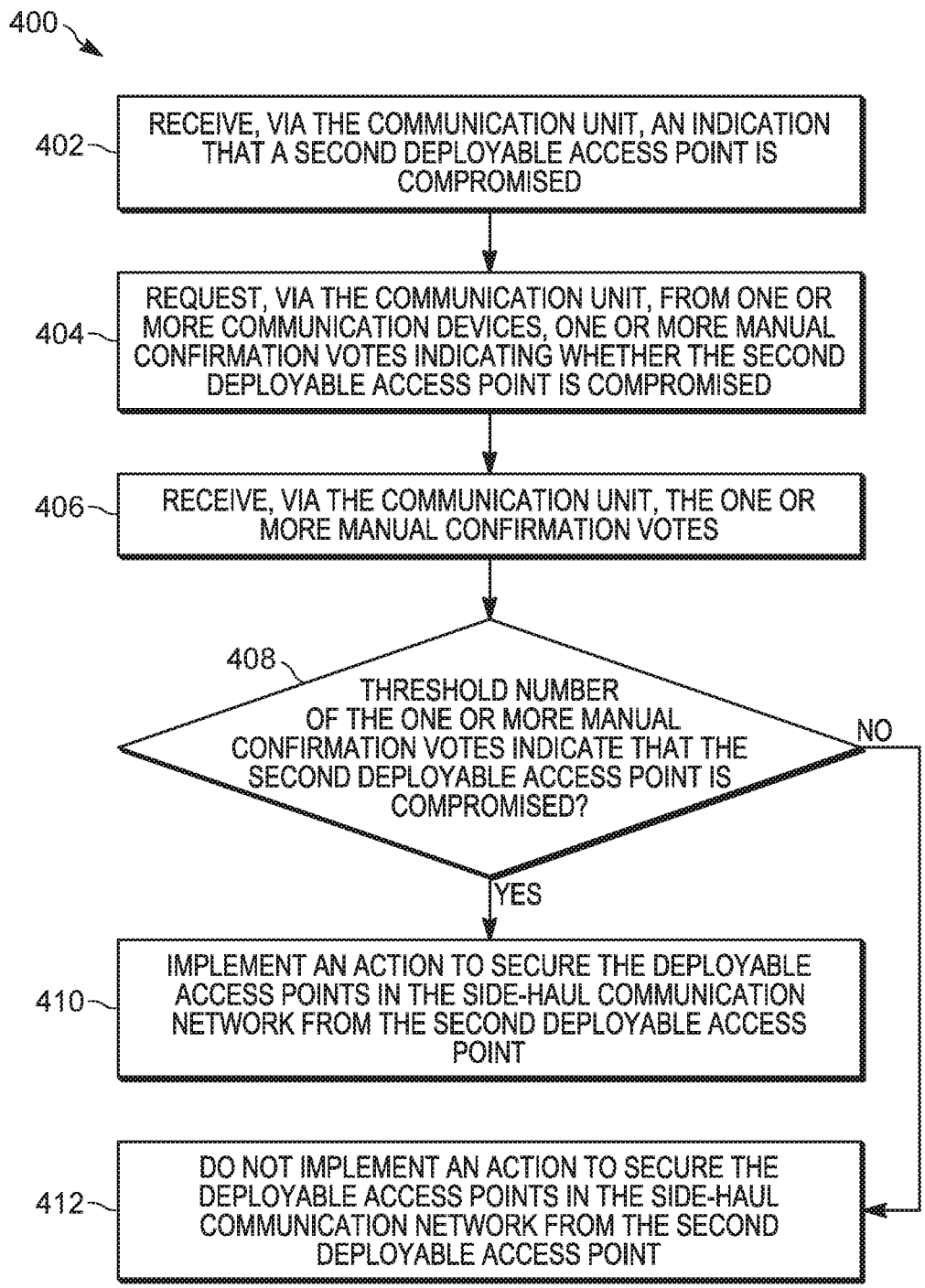
FIG. 4 is a flowchart of a method for securing deployable access points in a side-haul communication network from a compromised deployable access point in accordance with some embodiments.

Attention is now directed to FIG. 4 which depicts a flowchart representative of a method 400 for securing deployable access points in a side-haul communication network from a compromised deployable access point. The operations of the method 400 of FIG. 4 correspond to machine readable instructions that are executed by, for example, the example deployable access point 120 of FIG. 2, and specifically by the controller 220 of the example deployable access point 120 of FIG. 2. In the illustrated example, the instructions represented by the blocks of FIG. 4 are stored at the memory 222 for example, as the application 223. The method 400 of FIG. 4 is one way in which the controller 220 and/or the deployable access point 120 and/or the system 100 is configured. Furthermore, the following discussion of the method 400 of FIG. 4 will lead to a further understanding of the system 100, and its various components. However, it is to be understood that the method 400 and/or the system 100 may be varied, and need not work exactly as discussed herein in conjunction with each other, and that such variations are within the scope of present embodiments.

The method 400 of FIG. 4 need not be performed in the exact sequence as shown and likewise various blocks may be performed in parallel rather than in sequence. Accordingly, the elements of method 400 are referred to herein as "blocks" rather than "steps." The method 400 of FIG. 4 may be implemented on variations of the system 100 of FIG. 1, as well.

The method 400 is further described with respect to the first deployable access point 120-1 securing deployable access points 120-1, 120-3 in the side-haul communication network 110 from a compromised deployable access point, such as the second deployable access point 120-2. For example, the second deployable access point 120-2 may have been stolen and/or compromised (e.g. acquired by a malicious user).

At a block 402, the controller 220 of the first deployable access point 120-1 receives, via the communication unit 202, an indication that the second deployable access point 120-2 is compromised. For example, the indication may be received from a communication device 130 in the coverage range 140-1 of the first deployable access point 120-1, such as the device 130-1; specifically, a user of the communication device 130-1 may have visually noted that the second deployable access point 120-2 was stolen and/or compromised, manually opened the application 324 at the communication device 130-1, and caused the indication to be transmitted to the first deployable access point 120-1 by manually providing an identifier of the second deployable access point 120-2 and/or a manual confirmation vote via the application 324 that the second deployable access point 120-2 was compromised. Alternatively, the indication may be received from the dispatch communication device 170 and/or another application at the first deployable access point 120-1 (or another deployable access point 120) and/or a device in communication with the external network 150.

At a block 404, the controller 220 of the first deployable access point 120-1, via the communication unit 202, requests from one or more communication devices 130, 170, one or more manual confirmation votes indicating whether the second deployable access point 120-2 is compromised. For example, the controller 220 of the first deployable access point 120-1 may transmit, to one or more communication devices 130, 170, a command which requests a manual confirmation of the second deployable access 120-2 being compromised. The command may cause the respective application 324 to automatically open at a communication device 130, 170 at which the command is received, to prompt a user thereof to interact with the communication device 130, 170 to manually enter a confirmation vote.

The one or more manual confirmation votes, from the one or more communication devices 130, may be requested via at least the third deployable access point 120-3; for example, the command may be transmitted to the third deployable access point 120-3 which transmits the command to the communication device 130-3. In some embodiments, the command may also be transmitted to the second deployable access point 120-2 which may or may not transmit the command to the second communication device 130-2, depending on whether the second deployable access point 120-2 being compromised includes the second deployable access point 120-2 continuing to communicate, or not, with the second communication device 130-2.

Alternatively, the one or more manual confirmation votes, may be requested from the dispatch communication device 170, via the external network 150. For example, a user of one of the communication devices 130 and/or another portable communication not in the network 110, may report to a dispatch center that the second deployable access point 120-2 has been compromised, and a dispatcher operating the dispatch communication device 170 may then cause a manual confirmation vote to be generated and transmitted to the first deployable access point 120-1.

A person of skill in the art understands that some of the manual confirmation votes may indicate that the second deployable access point 120-2 has been compromised, while other manual confirmation votes may indicate that the second deployable access point 120-2 has not been compromised.

At a block 406, the controller 220 of the first deployable access point 120-1 receives, via the communication unit 202, the one or more manual confirmation votes, for example via the third deployable access point 120-3, the external network 150, and/or the second deployable access point 120-2.

At a block 406, the controller 220 of the first deployable access point 120-1 determines whether a threshold number of the one or more manual confirmation votes indicate that the second deployable access point 120-2 is compromised.

For example, a threshold number of manual confirmation votes may include at least one further manual confirmation vote, other than the indication received at the block 402, that indicates that the second deployable access point 120-2 is compromised. Specifically, only those manual confirmation votes that indicate that the second deployable access point 120-2 is compromised may be tallied and/or counted to determine whether the threshold number of manual confirmation votes that indicate that the second deployable access point 120-2 is compromised has been reached.

Furthermore, the controller 220 of the first deployable access point 120-1 may be configured to weight the manual confirmation votes, depending on one or more of: one or more of users associated with the one or more communication devices 130, 170 from which the one or more manual confirmation votes are received; roles of the one or more of users associated with the one or more communication devices 130, 170 from which the one or more manual confirmation votes are received; incident-related roles of the one or more of users associated with the one or more communication devices 130, 170 from which the one or more manual confirmation votes are received; locations associated with the one or more communication devices 130, 170 from which the one or more manual confirmation votes are received; a respective deployable access point 120-2, 120-3 via which the one or more manual confirmation votes are received; whether the one or more communication devices 130, 170 from which the one or more manual confirmation votes are received was last in communication with the second deployable access point 120-2; whether the one or more communication devices 130, 170 from which the one or more manual confirmation votes are received is currently in communication with the second deployable access point 120-2.

Hence, some manual confirmation votes may be weighted higher than other manual confirmation votes. For example, manual confirmation votes from communication devices 130, 170 associated with roles associated with higher ranked users (e.g. higher ranked first responders and/or higher ranked officers, and the like), may be weighted higher than manual confirmation votes received from communication devices 130, 170 associated with roles associated with lower ranked users, and the like.

Furthermore, in some examples, at least one of the manual confirmation votes that indicate that the second deployable access point 120-2 is compromised must be from a communication device 130 associated with a user having a given role and/or a given rank and/or having a role and/or rank that is higher than the given role and/or given rank, for example in an organizational hierarchy. For example, in some of these embodiments, where the communication devices 130 are associated with police officers, at least one of the manual confirmation votes that indicate that the second deployable access point 120-2 is compromised must be from a communication device 130 associated with a police officer having a rank and/or a role of captain, or higher. In some examples, the roles may be incident-related and/or incident dependent, such as incident commander, communications unit leader, tactical operations office, and the like.

Furthermore, manual confirmation votes received from communication devices 130 last in communication with the second deployable access point 120-2 (e.g. such as the communication device 130-2) may be weighted lower than manual confirmation votes from communication devices 130 that have not been in communication with the second deployable access point 120-2 (e.g. such as the communication device 130-3).

Similarly, manual confirmation votes received from communication devices 130 currently in communication with the second deployable access point 120-2 (e.g. when received, for example the communication device 130-2) may be weighted lower than manual confirmation votes received from other deployable access points 120 (e.g. such as the third deployable access point 120-3).

As the weighting may use a fractional scheme, the threshold number of the one or more manual confirmation votes that indicate that the second deployable access point 120-2 is compromised may be an integer value or a non-integer value.

When a threshold number of the one or more manual confirmation votes indicate that the second deployable access point 120-2 is compromised (e.g. a "YES" decision at the block 408), at a block 410, the controller 220 of the first deployable access point 120-1 implements an action to secure the deployable access points 120 in the side-haul communication network 110 from the second deployable access point 120-2. The threshold number of the one or more manual confirmation votes that indicate that the second deployable access point 120-2 is compromised may include one or more of: a pre-configured threshold number; a number of the deployable access point 120 in the side-haul communication network 110 minus the number of deployable access point 120 that may be compromised; a number based on a type of a compromised deployable access point 120 (e.g. the threshold number may be higher for a command deployable access point 120 that is than for other deployable access point 120).

For example, the first deployable access point 120-1 may transmit a command to the second deployable access point 120-2, the command for causing the second deployable access point 120-2 to one or more of: delete all data stored at the second deployable access point; delete a subset of the data stored at the second deployable access point; delete cryptographic keys; delete radio-frequency tuning data; delete telemetry data; disable a respective communication unit 302; shut down the respective communication unit 302; delete radio-frequency parameters; retune the respective communication unit 302 to frequencies not used by one or more of a back-haul communication network and the side-haul communication network 110, and the like. When the second deployable access point 120-2 comprises one or more of a drone and an autonomous vehicle, the command may be for causing the second deployable access point 120-2 to one or more of: return to a base; and move to a secure area (e.g. the command may include GPS coordinates of the base and/or the secure area, and/or the GPS coordinates of the base and/or the secure area may be preconfigured at the second deployable access point 120-2).

Alternatively, the first deployable access point 120-1 may one or more of: cause disabling of the side-haul links 160-1, 160-2 to the second deployable access point 120-2; cause jamming of the second deployable access point 120-2, and the like. In each of these example embodiments, the first deployable access point 120-1 may disable and/or jam the link 160-1 with the second deployable access point 120-2, and transmit a command to the third deployable access point 120-3 to cause the third deployable access point 120-3 to disable and/or jam the link 160-2 with the second deployable access point 120-2.

Alternatively, the first deployable access point 120-1 may: generate a cryptographic key used for communications between the deployable access points 120 in the side-haul communication network 110; transmit the cryptographic key to one or more of the deployable access points 120, other than the second deployable access point 120-2, the cryptographic key to be used by the one or more of the deployable access points 120, other than the second deployable access point 120-2, to communicate on the side-haul communication network 110 using the cryptographic key; and communicate with the one or more deployable access points 120 in the side-haul communication network 110 using the cryptographic key.

For example, the first deployable access point 120-1 may transmit the cryptographic key to the third deployable access point 120-3, but not the second deployable access point 120-2, thereby disabling the second deployable access point 120-2 from communicating in the side-haul communication network 110.

The cryptographic key may be transmitted to all the deployable access points 120, but not the second deployable access point 120-2, when requesting the one or more manual confirmation votes; for example, in the embodiment in FIG. 1, the cryptographic key may be transmitted to the third deployable access point 120-3, but not the second deployable access point 120-2. When the threshold number of the one or more manual confirmation votes indicate that the second deployable access point 120-2 is compromised (e.g. a "YES" decision at the block 408), the first deployable access point 120-1 may transmit, to the deployable access points 120 in the side-haul communication network 110, other than the second deployable access point 120-3, a command to begin communicating using the cryptographic key. For example, in the embodiment in FIG. 1, the command to begin communicating using the cryptographic key may be transmitted to the third deployable access point 120-3, but not the second deployable access point 120-2.

Alternatively, rather than a cryptographic key, the first deployable access point 120-1 may transmit updated and/or new Tx/Rx (transmit/receive) communication parameters (e.g. which may include, but is not limited to, new frequency parameters, new modulation parameters, new technology parameters (e.g. CDMA/LTE) and the like), also referred to herein as radio-frequency parameters, to all deployable access points other than the second deployable access point 120-2 (e.g. the third deployable access point 120-3). The first deployable access point 120-1 may transmit a command to begin communicating using the updated and/or new radio-frequency parameters, to the third deployable access point 120-3 but not the second deployable access point 120-2, in a manner similar to causing the third deployable access point 120-3 to begin communicating using the cryptographic key.

Returning to the block 408, when the threshold number of the one or more manual confirmation votes indicate that the second deployable access point 120-2 is not compromised (e.g. a "NO" decision at the block 408), at a block 412, the controller 220 of the first deployable access point 120-1 takes no action to secure the deployable access points 120-1, 120-3 in the side-haul communication network from the second deployable access point 120-2. For example, the lack of the threshold number of manual confirmation votes may indicate that the indication received at the block 402 may have been generated and/or transmitted in error. Alternatively, at the block 408, the controller 220 of the first deployable access point 120-1 may transmit a message to the originator of the indication received at the block 402 to recommend a follow-up action including, but not limited to, indicating additional actions that the originator can take to convince others of the second deployable access point 120-2 being compromised (e.g. emailing and/or messaging users who may be able to observe the second deployable access point 120-2). Such actions may include suggesting to the others to vote conditionally, for example, a manual confirmation vote may be a conditional vote to indicate that the second deployable access point 120-2 is compromised but only when at least one other non-conditional manual confirmation votes are received (e.g. "yes" votes); hence, in these examples, one or more of the manual confirmation votes received at the block 406 may be non-conditional while others of the manual confirmation votes received at the block 406 may be conditional. The threshold number of non-conditional "yes" votes that may be lower than the threshold number of the block 408, such that the, when the threshold number of non-conditional "yes" votes is received, the conditional "yes" votes are added to the non-conditional "yes" votes to determine whether the threshold number of manual confirmation votes of block 408 has been met.

Figure 5:
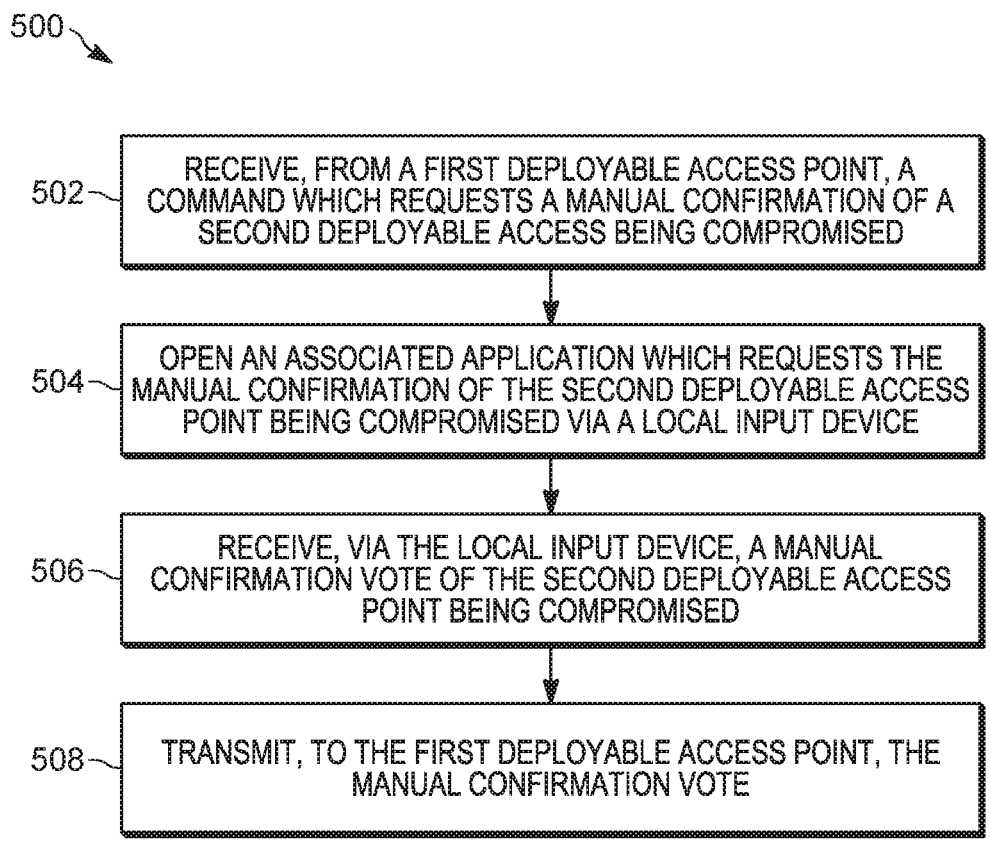
FIG. 5 is a flowchart of a method for receiving manual confirmations of a deployable access point being compromised in accordance with some embodiments.

Attention is now directed to FIG. 5 which depicts a flowchart representative of a method 500 for receiving manual confirmations of a deployable access point being compromised. The operations of the method 500 of FIG. 5 correspond to machine readable instructions that are executed by, for example, the example communication device 130 of FIG. 3, and specifically by the controller 320 of the example communication device 130. In the illustrated example, the instructions represented by the blocks of FIG. 5 are stored at the memory 322 for example, as the application 323. The method 500 of FIG. 5 is one way in which the controller 320 and/or the example communication device 130 and/or the system 100 is configured. Furthermore, the following discussion of the method 500 of FIG. 5 will lead to a further understanding of the system 100, and its various components. However, it is to be understood that the method 500 and/or the system 100 may be varied, and need not work exactly as discussed herein in conjunction with each other, and that such variations are within the scope of present embodiments.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 100 of FIG. 1, as well.

The method 500 is further described with respect to the example communication device 130, the method 400 may also be implemented at the dispatch communication device 170.

At a block 502, the controller 320 of the example communication device 130 receives a command, for example from the first deployable access point 120-1, which requests a manual confirmation of a second deployable access being compromised, for example the second deployable access point 120-2.

At the block 504, the controller 320 of the example communication device 130 opens the associated application 324 which requests the manual confirmation of the second deployable access point being compromised via a local input device (e.g. the input device 306).

At the block 506, the controller 320 of the example communication device 130 receives, via the local input device, a manual confirmation vote of the second deployable access point 120-2 being compromised. The manual confirmation vote may indicate that the second deployable access point 120-2 is compromised or not compromised.

At the block 508, the controller 320 of the example communication device 130 transmits, to the first deployable access point 120-1, the manual confirmation vote.

Figure 6:
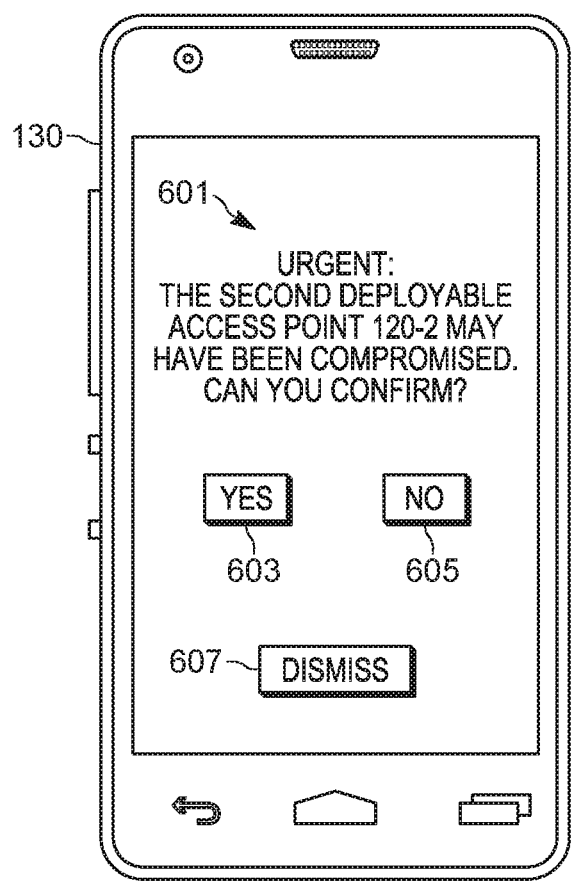
FIG. 6 is a graphic user interface for receiving manual confirmations of a deployable access point being compromised in accordance with some embodiments.

For example, attention is directed to FIG. 6 which depicts an example communication device 130 that has received a command which requests a manual confirmation of a deployable access being compromised, for example the second deployable access point 120-2. A person of skill in the art understands that the controller 320 of the example communication device 130 of FIG. 6 has, in response to receiving the command at the block 502 of the method 500, is executing the application 324 and is controlling a display device to render an example graphic user interface (GUI) 601 that may include text to solicit a manual confirmation vote. As depicted, the text comprises: "URGENT: The Second Deployable Access Point 120-2 May Have Been Compromised. Can you confirm?", however any suitable text is within the scope of the present specification.

Furthermore, as depicted, the text includes a numerical identifier "120-2" of the second deployable access point 120-2. A person of skill in the art understands that the identifier may be transmitted to the communication device 130 in the command received at the block 502 of the method 500. Alternatively, rather than a numerical identifier of the second deployable access point 120-2, the command and/or the text of the example GUI 601 may include an alias of the second deployable access point 120-2. Hence, the communication devices 130 and/or the deployable access points 120 may have access to a memory and/or a database of identifiers of the deployable access points 120 and/or aliases thereof.

The example GUI 601 further includes selectable options for receiving input for the manual confirmation votes. For example, as depicted, the example GUI 601 includes: a virtual button 603 which may be selected by a user, (e.g. via a touch screen of the display device), to indicate that "YES" the second deployable access point 120-2 has been compromised; and a virtual button 605 which may be selected to indicate that "NO" the second deployable access point 120-2 has not been compromised. The selected manual confirmation vote of "YES" or "NO" (or in any other suitable format) is transmitted to the first deployable access point 120-1, assuming the command of the block 502 was received therefrom. As depicted, the example GUI 601 may further include a virtual button 607 for dismissing the example GUI 601, for example, when a user is not able to positively or negatively confirm whether the second deployable access point 120-2 has been compromised; when the virtual button 607 is selected, the method 500 may end at the block 506 and/or the manual confirmation vote may not be transmitted at the block 508.

Alternatively, the example GUI 601 may provide an option for voting "Yes" conditionally, as described above.

Alternatively, the example GUI 601 may also be provided at the dispatch communication device 170.

Figure 7:
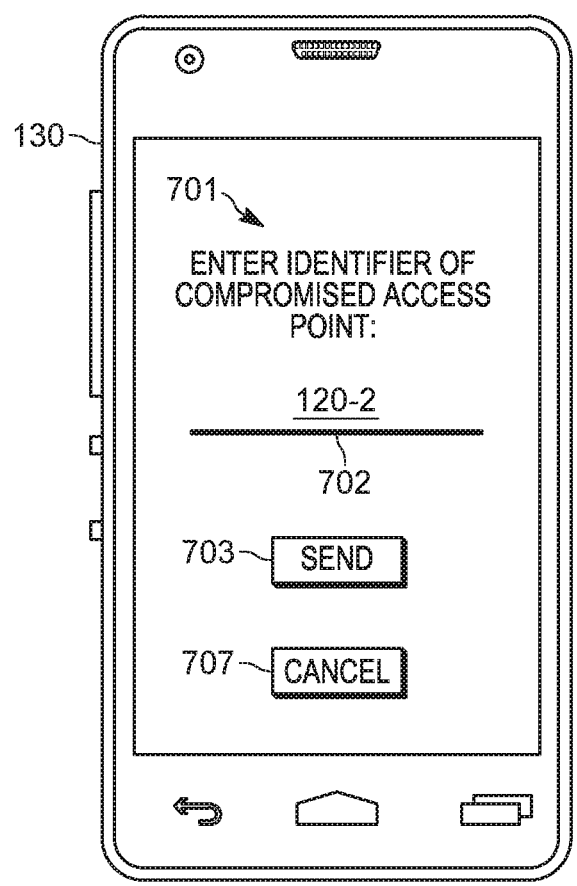
FIG. 7 is a graphic user interface for initiating an indication of a deployable access point being compromised in accordance with some embodiments.

Attention is next directed to FIG. 7 which depicts another example GUI 701 that may be rendered at the display device of the example communication device 130, for example when the application 324 is being executed in another mode to generate an indication that a deployable access point 120 is compromised. For example, a user of the example communication device 130 may access a menu system, and the like, and/or open the application 324 via an icon, and the like, when the user notices that, and/or has evidence that the second deployable access point 120-2, and/or another deployable access point 120, is compromised.

The example GUI 701 includes text to solicit an identifier of a compromised deployable access point 120, such as a numerical identifier, an alias, and the like. As depicted the text comprises "Enter An Identifier Of Comprised Access Point", though any suitable text is within the scope of the present specification. Alternatively, the GUI 701 may provide a list of identifiers of the deployable access point 120 for selection.

The example GUI 701 further includes a field 702 for entering the identifier of the compromised deployable access point 120, for example via the input device 306 (e.g. as depicted "120-2"). The example GUI 701 further includes a virtual button 703, which, when actuated, causes the example communication device 130 of FIG. 7 to transmit the identifier entered in the field 702 to a deployable access point 120, for example as an indication that the second deployable access point 120-1 is compromised.

The deployable access point 120 to which the indication is transmitted may be a deployable access point 120 proving a coverage range 140 for the example communication device 130 of FIG. Receipt of the indication at a deployable access point 120 may cause such a deployable access point 120 to implement the method 400, the receipt of the indication being implemented as the block 402 of the method 400. Receipt of such an indication may further count as a positive manual confirmation vote of a deployable access point 120 (e.g. identified by the identifier received at the field 702) being compromised.

As depicted, the example GUI 701 further includes a virtual button 707 for dismissing the example GUI 701, for example, when a user wishes to "CANCEL" identifying a deployable access point 120 being compromised.

Alternatively, the example GUI 701 may also be provided at the dispatch communication device 170.

Figure 8:
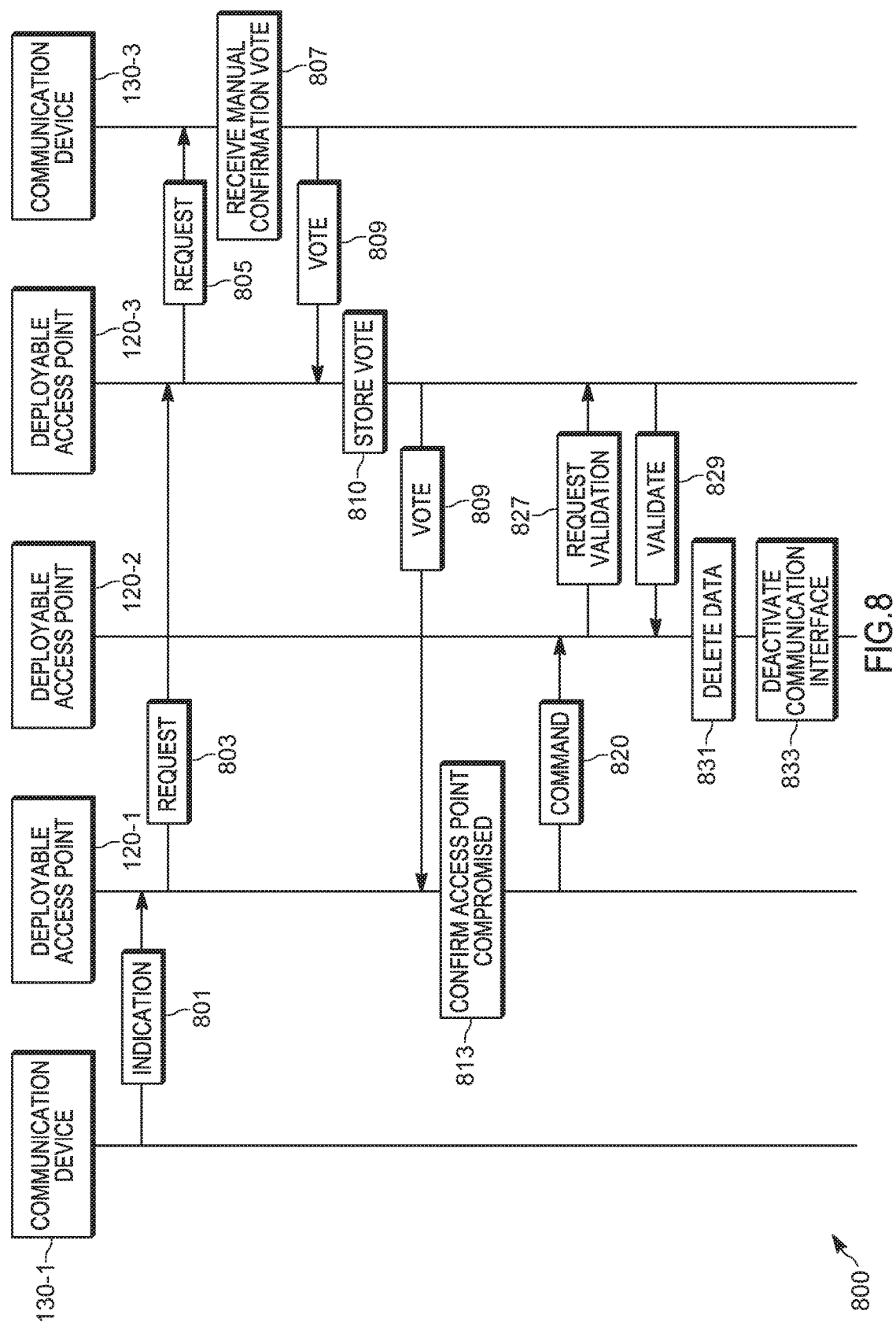
FIG. 8 is a signal diagram showing communication between components of the system of FIG. 1 when implementing a method for securing deployable access points in a side-haul communication network from a compromised deployable access point in accordance with some embodiments.
Figure 9:
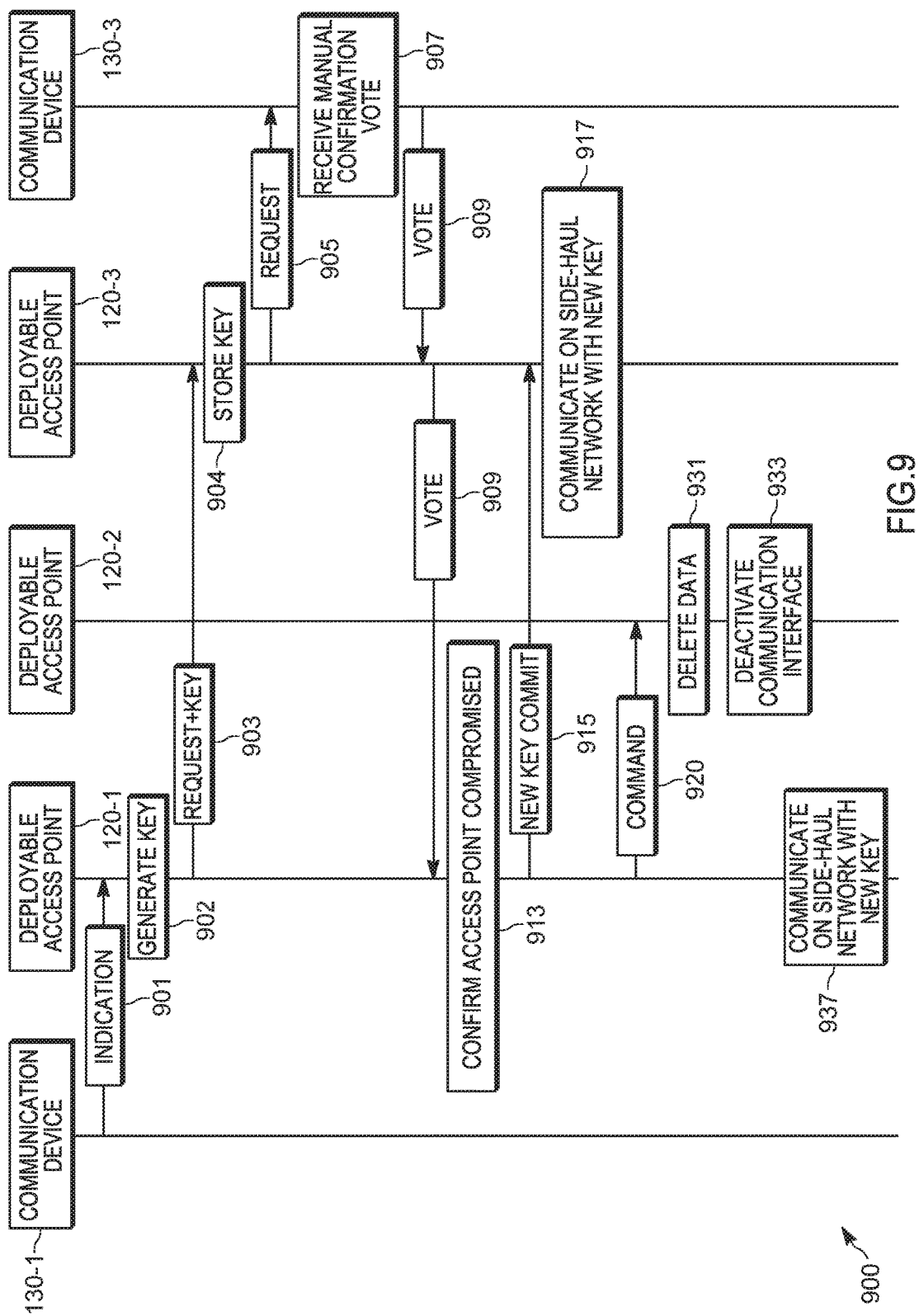
FIG. 9 is a signal diagram showing communication between components of the system of FIG. 1 when implementing a method for securing deployable access points in a side-haul communication network from a compromised deployable access point in accordance with other embodiments.

Example embodiments of the method 400 and the method 500 are next described with respect to signal diagrams of FIG. 8 and FIG. 9. Furthermore, the method 400 and the method 500 will be described with respect to the second deployable access point 120-2 being compromised, and the first deployable access point 120-1 implementing the method 400, while the communication device 130-3 implements the method 500. A person of skill in the art further understands that, in the examples of FIG. 8 and FIG. 9, the third deployable access point 120-3 is adapted to assist in implementing the method 400 and the method 500. Furthermore, while the examples of FIG. 8 and FIG. 9 are described with respect to the communication devices 130, the examples of FIG. 8 and FIG. 9 may also be implemented in conjunction with the dispatch communication device 170.

Attention is next directed to FIG. 8 which depicts a signal diagram 800 showing communication between the deployable access points 120 and a subset of the communication devices 130 of the system 100.

The communication device 130-1 transmits an indication 801 of the second deployable access point 120-2 being compromised (which may include an identifier of the second deployable access point 120-2), for example when the identifier of the second deployable access point 120-2 is received at the field 702 of the GUI 701, and the virtual button 703 is actuated.

The first deployable access point 120-1 receives the indication 801 (e.g. at the block 402 of the method 400) and transmits a request 803 (e.g. at the block 404 of the method 400) for one or more manual confirmation votes indicating whether the second deployable access point 120-2 is compromised to all deployable access points 120 which may include or, as depicted, exclude the second deployable access point 120-2. Hence, as depicted the third deployable access point 120-3 receives the request 803 (which may include the identifier of the second deployable access point 120-2) and transmits a request 805 to all communication devices 130 in the coverage range 140-1, as depicted the communication device 130-3. The request 805 is also for one or more manual confirmation votes indicating whether the second deployable access point 120-2 is compromised, and may include a command which requests a manual confirmation of the second deployable access 120-2 being compromised. Hence, the communication device 130-3 may receive the request 805 (e.g. at the block 502 of the method 500), causing the communication device 130-3 to open the application 324 (e.g. at the block 504 of the method 500) and receive 807 (e.g. at the block 506 of the method 500) a manual confirmation vote 809 via the GUI 601, which is transmitted to the first deployable access point 120-1 (e.g. at the block 504 of the method 500), via the third deployable access point 120-3. The third deployable access point 120-3 may optionally store 810 the manual confirmation vote 809 (e.g. as depicted).

The first deployable access point 120-1 receives the manual confirmation vote 809 (e.g. at the block 406 of the method 400), and determines whether the manual confirmation vote 809 confirms (e.g. "YES") or does not firm (e.g. "NO") that the second deployable access point 120-2 is compromised.

While not depicted, the first deployable access point 120-1 may receive a plurality of manual confirmation votes, in particular from each communication device 130 that received a request similar to the request 805. For example, the request 803 may be transmitted to all the deployable access points 120 of the system 100, which in turn transmits a request similar to the request 805 to all communication devices 130 in a respective coverage range 140. In some examples, the request 803 is also transmitted to the second deployable access point 120-2, though in other examples, the request 803 may not be transmitted to the second deployable access point 120-2. Hence, in some examples, a manual confirmation vote may also be received from the communication device 130-2 via the second deployable access point 120-2.

The first deployable access point 120-1 may count all the manual confirmation votes that confirmed that the second deployable access point 120-2 is compromised (e.g. all the "YES" votes), and compare to a threshold number (e.g. at the block 408 of the method 400). Such a count may include a count of the indication 801; in other words, the indication 801 may be included in the threshold number of the one or more manual confirmation votes that indicate that the second deployable access point 120-2 is compromised. In some examples, the threshold number may be "2" such that at least two positive manual confirmation votes are used to confirm that the second deployable access point 120-2 is compromised (e.g. the indication 801 and one further manual confirmation vote, such as the manual confirmation vote 809).

A person of skill in the art understands that the first deployable access point 120-1 may weight the manual confirmation votes based on one or more of: one or more of users associated with the one or more communication devices 130, 170 from which the one or more manual confirmation votes are received; roles of the one or more of users associated with the one or more communication devices 130, 170 from which the one or more manual confirmation votes are received; incident related roles of the one or more of users associated with the one or more communication devices 130, 170 from which the one or more manual confirmation votes are received; locations associated with the one or more communication devices 130, 170 from which the one or more manual confirmation votes are received; a respective deployable access point 120-2, 120-3 via which the one or more manual confirmation votes are received; whether the one or more communication devices 130, 170 from which the one or more manual confirmation votes are received was last in communication with the second deployable access point 120-2; and whether the one or more communication devices 130, 170 from which the one or more manual confirmation votes are received is currently in communication with the second deployable access point 120-2. Hence, to perform such a weighting, the manual confirmation votes may be received with identifiers of a deployable access point 120 and/or a communication device 130 from which a manual confirmation vote is received and/or the first deployable access point 120-1 may have access to a database (e.g. stored at a respective memory 222 and/or accessible at a remote device via a respective communication unit 202) storing the roles and/or identifiers of users in association with identifiers of communication devices 130 they are operating. The first deployable access point 120-1 may also have access to a database that indicates which deployable access point 120 each communication device 130 has last been in communication, and the like.

As depicted, the first deployable access point 120-1 confirms 813 that the second deployable access point 120-2 is compromised (e.g. the threshold number of the one or more manual confirmation votes indicate that the second deployable access point 120-2 is compromised: a "YES" decision at the block 408 of the method 400), and transmits a command 820 to the second deployable access point 120-2 to implement an action (e.g. at the block 410 of the method 400) to secure the deployable access points 120 in the side-haul communication network 110 from the second deployable access point 120-2. For example, the command 820 may cause the second deployable access point 120-2 to one or more of: delete all data stored at the second deployable access point 120-2; delete a subset of the data stored at the second deployable access point 120-2; delete cryptographic keys; delete radio-frequency tuning data; delete telemetry data; disable a respective communication unit 302; shut down the respective communication unit 302; delete radio-frequency parameters; retune the respective communication unit 302 to frequencies not used by one or more of a back-haul communication network and the side-haul communication network 110, and the like. When the second deployable access point 120-2 comprises one or more of a drone and an autonomous vehicle, the command may be for causing the second deployable access point 120-2 to one or more of: return to a base; and move to a secure area (e.g. the command 820 may include GPS coordinates of the base and/or the secure area, and/or the GPS coordinates of the base and/or the secure area may be pre-configured at the second deployable access point 120-2).

As depicted, the second deployable access point 120-2 receives the command 820 and optionally transmits a request 827 to the third deployable access point 120-3 to validate the command 820. The third deployable access point 120-3 may receive the request 827 and, when the stored manual confirmation vote 809 (e.g. assuming that the third deployable access point 120-3 stored 810 the manual confirmation vote 809) indicates that the second deployable access point 120-2 is compromised, the third deployable access point 120-3 transmits a validate 829 command to the second deployable access point 120-2, which causes the second deployable access point 120-2 to delete 831 data, as described above, and optionally deactivate 833 a respective communication unit 202. However, in other examples, the second deployable access point 120-2 may delete 831 data, as described above, and optionally deactivate 833 a respective communication unit 202 when the command 820 is received without a validation from the third deployable access point 120-3.

Either way, the second deployable access point 120-2 is no longer able to communicate on the side-haul communication network 110, which secures the other deployable access points 120 in the side-haul communication network 110 from the second deployable access point 120-2.

Alternatively, the first deployable access point 120-1 may cause disabling of side-haul links 160-1, 160-2 to the second deployable access point 120-2, for example by disabling the side-haul link 160-1, and transmitting a command to disable the side-haul link 160-2 to the third deployable access point 120-3.

While not depicted, when the first deployable access point 120-1 does not confirm that the second deployable access point 120-2 is compromised (e.g. the threshold number of the one or more manual confirmation votes do not indicate that the second deployable access point 120-2 is compromised: a "NO" decision at the block 408 of the method 400), the first deployable access point 120-1 does not implement an action (e.g. at the block 412 of the method 400) to secure the other deployable access points 120 in the side-haul communication network 110 from the second deployable access point 120-2. For example, the indication 801 may have been transmitted in error and/or a user of the communication device 130-1 may have initiated the indication 801 prior to confirming that the second deployable access point 120-2 was compromised; in these examples, the user of the third communication device 130-3 can prevent the disabling, and the like, of the second deployable access point 120-2 by activating the virtual button 605.

Attention is next directed to FIG. 9 which depicts a signal diagram 900 showing communication between the deployable access points 120 and a subset of the communication devices 130 of the system 100. The signal diagram 900 shows another example of the method 400 and the method 500. The signal diagram 900 is similar to the signal diagram 800, with like elements having like numbers, however in a "900" series rather than an "800" series, unless otherwise indicated.

The communication device 130-1 transmits an indication 901 of the second deployable access point 120-2 which is received at the first deployable access point 120-1. In these examples, the first deployable access point 120-1 generates 902 a cryptographic key used for communications between the deployable access points 120 in the side-haul communication network 110, which is different from a cryptographic key currently being used by the deployable access points 120.

The first deployable access point 120-1 transmits a request 903 with the cryptographic key to the third deployable access point 120-3, the request 903 otherwise being similar to the request 803. The third deployable access point 120-3 receives the request 903 and stores 904 the cryptographic key. A person of skill in the art understands that the request 903 and the cryptographic key is transmitted to all deployable access points 120 in the side-haul communication network 110 other than the second deployable access point 120-2, and that each of the deployable access points 120 in the side-haul communication network 110, other than the second deployable access point 120-2, stores the cryptographic key.

The third deployable access point 120-3 transmits a request 905 to the communication device 130-3. The request 905 is similar to the request 805 and may cause the communication device 130-3 to open the application 324 and receive 907 a manual confirmation vote 909 via the GUI 601, which is transmitted to the first deployable access point 120-, via the third deployable access point 120-3. The third deployable access point 120-3 may optionally store the manual confirmation vote 909, though, as depicted, the deployable access point 120-3 does not store the manual confirmation vote 909.

The first deployable access point 120-1 receives the manual confirmation vote 909 and confirms 913 that the second deployable access point 120-2 is compromised (or alternatively does not confirms that the second deployable access point 120-2 is compromised and hence the method 400 ends at the block 412 of the method 400). While not depicted, the first deployable access point 120-1 may receive a plurality of manual confirmation votes, for example from each communication device 130 that received a request similar to the request 905.

In contrast to the signal diagram 800, in response to confirming that the second deployable access point 120-2 is compromised, the first deployable access point 120-1 transmits a new key commit command 915 to the third deployable access point 120-3 to cause the third deployable access point 120-3 to begin communicating 917 on the side-haul communication network 110 using the cryptographic key previously stored 904 at the third deployable access point 120-3. The cryptographic key used previously may be deleted.

Furthermore, while not depicted, the new key commit command 915 may be transmitted to all deployable access points 120 in the side-haul communication network 110 that received the cryptographic key with the request 903 thereby causing all the deployable access points 120, other than the second deployable access point 120-2, to begin communicating on the side-haul communication network 110 using the cryptographic key received with the request 903. Hence, the deployable access points 120 in the side-haul communication network 110 are secured from the second deployable access point 120-2.

As depicted, the first deployable access point 120-1 transmits a command 920 to the second deployable access point 120-2, similar to the command 820, to implement an action to further secure the deployable access points 120 in the side-haul communication network 110 from the second deployable access point 120-2. As depicted, the second deployable access point 120-2 receives the command 920, which causes the second deployable access point 120-2 to delete 931 data, as described above, and optionally deactivate 933 a respective communication unit 202.

After the command 920 is transmitted, the first deployable access point 120-1 further begins communicating 937 on the side-haul communication network 110 using the cryptographic key previously generated and transmitted to the third deployable access point 120-3. The cryptographic key used previously may be deleted.

Hence, as the cryptographic key has changed, the second deployable access point 120-2 is no longer able to communicate on the side-haul communication network 110, which secures the other deployable access points 120 in the side-haul communication network 110 from the second deployable access point 120-2. Furthermore, as the data at the second deployable access point 120-2 has been delete, a malicious user will not have access to the data.

Alternatively, rather than a cryptographic key and/or in addition to a cryptographic key, new and/or updated radio-frequency parameters may be changed and committed to. Alternatively, the first deployable access point 120-1 may cause jamming of the second deployable access point 120-2, for example by jamming the side-haul link 160-1, and transmitting a command to jam the side-haul link 160-2 to the third deployable access point 120-3

Figure 10:
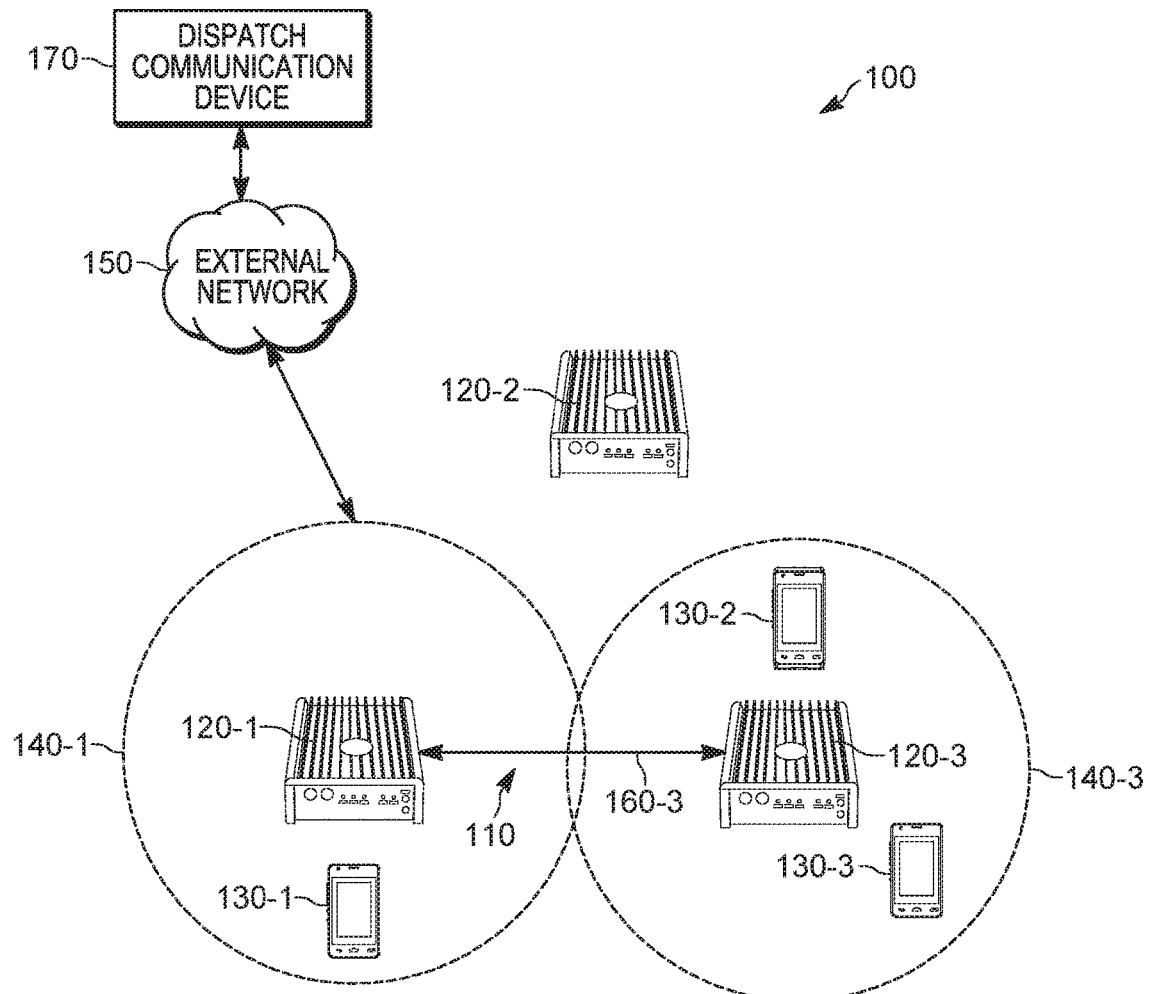
FIG. 10 depicts the system of FIG. 1 after the deployable access points in the side-haul communication network have been secured from a compromised deployable access point in accordance with some embodiments.

Attention is next directed to FIG. 10 which depicts the system 100 after the block 410 of the method 400 has been implemented at the first deployable access point 120. As depicted, the second deployable access point 120-2 is no longer in communication with the deployable access points 120-1, 120-3 and is no longer providing a coverage range 140 for the communication devices 130. Hence, the deployable access points 120-1, 120-3 are secured from the second deployable access point 120-2, as are the communication devices 130. Furthermore, the communication device 130-2 has moved into the coverage range 140-3 of the third deployable access point 120-3 so that the communication device 130-2 may continue to communicate in the system 100; however, in some examples, devices 130 that were last in communication with the second deployable access point 120-2 may be blocked from communicating with the deployable access points 120-1, 120-3. Further, the side-haul communication network 110 now includes only the link 160-3.

Hence, provided herein is a device, system and method for securing deployable access points in a side-haul communication network from a compromised deployable access point. Manual confirmation votes generated at communication devices are used to confirm that a deployable access point has been compromised, for example stolen, and the like; the manual confirmation votes may be based on a visual confirmation that the deployable access point has been compromised. When a threshold number of the manual confirmation votes indicate that the deployable access point has been compromised, the other deployable access points in the side-haul network are secured from the compromised deployable access point by deleting data at the compromised deployable access point that enables it to communicate on the side-haul network, disabling a communication unit of the compromised deployable access point, changing a cryptographic key in the side-haul communication network, disabling side-haul links with the compromised deployable access point, jamming the compromised deployable access point, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A deployable access point comprising:
   a portable housing;
   a communication unit configured to communicate with deployable access points using one or more side-haul links in a side-haul communication network; and
   a controller configured to:
     receive, via the communication unit, an indication that a second deployable access point is compromised;
     request, via the communication unit, from one or more communication devices, one or more manual confirmation votes indicating whether the second deployable access point is compromised;
     receive, via the communication unit, the one or more manual confirmation votes; and
     when a threshold number of the one or more manual confirmation votes indicate that the second deployable access point is compromised, implement an action to secure the deployable access points in the side-haul communication network from the second deployable access point.

2. The deployable access point of claim 1, wherein the indication that the second deployable access point is included in the threshold number of the one or more manual confirmation votes that indicate that the second deployable access point is compromised.

3. The deployable access point of claim 1, wherein the controller is further configured to request the one or more manual confirmation votes, from the one or more communication devices, via at least a third deployable access point.

4. The deployable access point of claim 1, wherein the controller is further configured to request the one or more manual confirmation votes, from the one or more communication devices, by:
   transmitting a command configured to control the one or more communication devices to open an associated application which requests a manual confirmation of the second deployable access point being compromised via a local input device.

5. The deployable access point of claim 1, wherein the controller is further configured to implement the action to secure the deployable access points in the side-haul communication network from the second deployable access point by transmitting a command to the second deployable access point, the command for causing the second deployable access point to one or more of:
   delete all data stored at the second deployable access point;
   delete a subset of the data stored at the second deployable access point;
   delete cryptographic keys;
   delete radio-frequency tuning data;
   delete telemetry data;
   disable a respective communication unit;
   shut down the respective communication unit;
   delete radio-frequency parameters;
   retune the respective communication unit to frequencies not used by one or more of a back-haul communication network and the side-haul communication network; and
   when the second deployable access point comprises one or more of a drone and an autonomous vehicle, one or more of: return to base; and move to a secure area.

6. The deployable access point of claim 1, wherein the controller is further configured to implement the action to secure the deployable access points in the side-haul communication network from the second deployable access point by one or more of:
   causing disabling of side-haul links to the second deployable access point; and
   causing jamming of the second deployable access point.

7. The deployable access point of claim 1, wherein the controller is further configured to implement the action to secure the deployable access points in the side-haul communication network from the second deployable access point by:
   generating one or more of a cryptographic key and radio-frequency parameters used for communications between the deployable access points in the side-haul communication network;
   transmitting one or more of the cryptographic key and the radio-frequency parameters to one or more of the deployable access points, other than the second deployable access point, the one or more of the cryptographic key and the radio-frequency parameters to be used by the one or more of the deployable access points, other than the second deployable access point, to communicate on the side-haul communication network using one or more of the cryptographic key and the radio-frequency parameters; and communicating with the one or more deployable access points in the side-haul communication network using one or more of the cryptographic key and the radio-frequency parameters.

8. The deployable access point of claim 7, wherein the controller is further configured to:

transmit one or more of the cryptographic key and the radio-frequency parameters to the one or more of the deployable access points, other than the second deployable access point, when requesting the one or more manual confirmation votes; and when the threshold number of the one or more manual confirmation votes indicate that the second deployable access point is compromised, transmit, to the one or more of the deployable access points in the side-haul communication network, other than the second deployable access point, a command to begin communicating using one or more of the cryptographic key and the radio-frequency parameters.

9. The deployable access point of claim 1, wherein the controller is further configured to weight the one or more manual confirmation votes based on one or more of:

one or more of users associated with the one or more communication devices from which the one or more manual confirmation votes are received;

roles of the one or more of users associated with the one or more communication devices from which the one or more manual confirmation votes are received;

incident-related roles of the one or more of users associated with the one or more communication devices from which the one or more manual confirmation votes are received;

locations associated with the one or more communication devices from which the one or more manual confirmation votes are received;

a respective deployable access point via which the one or more manual confirmation votes are received;

whether the one or more communication devices from which the one or more manual confirmation votes are received was last in communication with the second deployable access point; and whether the one or more communication devices from which the one or more manual confirmation votes are received are currently in communication with the second deployable access point.

10. A method comprising:

receiving, at a controller of a first deployable access point, via a communication unit of the first deployable access point, an indication that a second deployable access point is compromised, the communication unit configured to communicate with deployable access points using one or more side-haul links in a side-haul communication network;

requesting, using the controller, via the communication unit, from one or more communication devices, one or more manual confirmation votes indicating whether the second deployable access point is compromised;

receiving, at the controller, via the communication unit, the one or more manual confirmation votes; and when a threshold number of the one or more manual confirmation votes indicate that the second deployable access point is compromised, implementing, using the controller, an action to secure the deployable access points in the side-haul communication network from the second deployable access point.

11. The method of claim 10, wherein the indication that the second deployable access point is included in the threshold number of the one or more manual confirmation votes that indicate that the second deployable access point is compromised.

12. The method of claim 10, further comprising requesting the one or more manual confirmation votes, from the one or more communication devices, via at least a third deployable access point.

13. The method of claim 10, further comprising requesting the one or more manual confirmation votes, from the one or more communication devices, by:

transmitting a command configured to control the one or more communication devices to open an associated application which requests a manual confirmation of the second deployable access point being compromised via a local input device.

14. The method of claim 10, further comprising implementing the action to secure the deployable access points in the side-haul communication network from the second deployable access point by transmitting a command to the second deployable access point, the command for causing the second deployable access point to one or more of:

delete all data stored at the second deployable access point;

delete a subset of the data stored at the second deployable access point;

delete cryptographic keys;

delete radio-frequency tuning data;

delete telemetry data;

disable a respective communication unit;

shut down the respective communication unit;

delete radio-frequency parameters;

retune the respective communication unit to frequencies not used by one or more of a back-haul communication network and the side-haul communication network; and when the second deployable access point comprises one or more of a drone and an autonomous vehicle, one or more of: return to base; and move to a secure area.

15. The method of claim 10, further comprising implementing the action to secure the deployable access points in the side-haul communication network from the second deployable access point by one or more of:

causing disabling of side-haul links to the second deployable access point; and causing jamming of the second deployable access point.

16. The method of claim 10, further comprising implementing the action to secure the deployable access points in the side-haul communication network from the second deployable access point by:

generating one or more of a cryptographic key and radio-frequency parameters used for communications between the deployable access points in the side-haul communication network;

transmitting one or more of the cryptographic key and the radio-frequency parameters to one or more of the deployable access points, other than the second deployable access point, the one or more of the cryptographic key and the radio-frequency parameters to be used by the one or more of the deployable access points, other than the second deployable access point, to communicate on the side-haul communication network using one or more of the cryptographic key and the radio-frequency parameters; and communicating with the one or more deployable access points in the side-haul communication network using one or more of the cryptographic key and the radio-frequency parameters.

17. The method of claim 16, further comprising:
transmitting one or more of the cryptographic key and the radio-frequency parameters to the one or more of the deployable access points, other than the second deployable access point, when requesting the one or more manual confirmation votes; and
when the threshold number of the one or more manual confirmation votes indicate that the second deployable access point is compromised, transmitting, to the one or more of the deployable access points in the side-haul communication network, other than the second deployable access point, a command to begin communicating using one or more of the cryptographic key and the radio-frequency parameters.

18. The method of claim 10, further comprising weighting the one or more manual confirmation votes based on one or more of:
one or more of users associated with the one or more communication devices from which the one or more manual confirmation votes are received;
roles of the one or more of users associated with the one or more communication devices from which the one or more manual confirmation votes are received;
incident-related roles of the one or more of users associated with the one or more communication devices from which the one or more manual confirmation votes are received;
locations associated with the one or more communication devices from which the one or more manual confirmation votes are received;
a respective deployable access point via which the one or more manual confirmation votes are received;
whether the one or more communication devices from which the one or more manual confirmation votes are received was last in communication with the second deployable access point; and
whether the one or more communication devices from which the one or more manual confirmation votes are received are currently in communication with the second deployable access point.

19. A system comprising:
a plurality of deployable access points communicating in a side-haul communication network; and
one or more communication devices,
a first deployable access point, of the plurality of deployable access points, configured to:
receive an indication that a second deployable access point is compromised;
transmit, to the one or more communication devices, a command which requests a manual confirmation of the second deployable access point being compromised;
receive, from the one or more communication devices, one or more manual confirmation votes of the second deployable access point being compromised; and
when a threshold number of one or more manual confirmation votes indicate that the second deployable access point is compromised, implement an action to secure the deployable access points in the side-haul communication network from the second deployable access point,
the one or more communication devices configured to:
receive the command;
open an associated application which requests the manual confirmation of the second deployable access point being compromised via a local input device;
receive, via the local input device, a manual confirmation vote of the second deployable access point being compromised; and
transmit, to the first deployable access point, the manual confirmation vote.

20. The system of claim 19, wherein the action to secure the deployable access points in the side-haul communication network from the second deployable access point comprises transmitting a respective command to the second deployable access point to cause the second deployable access point to one or more of:
delete all data stored at the second deployable access point;
delete a subset of the data stored at the second deployable access point;
delete cryptographic keys;
delete radio-frequency tuning data;
delete telemetry data;
disable a respective communication unit;
shut down the respective communication unit;
delete radio-frequency parameters;
retune the respective communication unit to frequencies not used by one or more of a back-haul communication network and the side-haul communication network; and
when the second deployable access point comprises one or more of a drone and an autonomous vehicle, one or more of: return to base; and move to a secure area.

* * * * *